Oct. 18, 1932.     L. A. M. PHELAN     1,883,244
ELECTRICAL SWITCH
Original Filed April 27, 1927
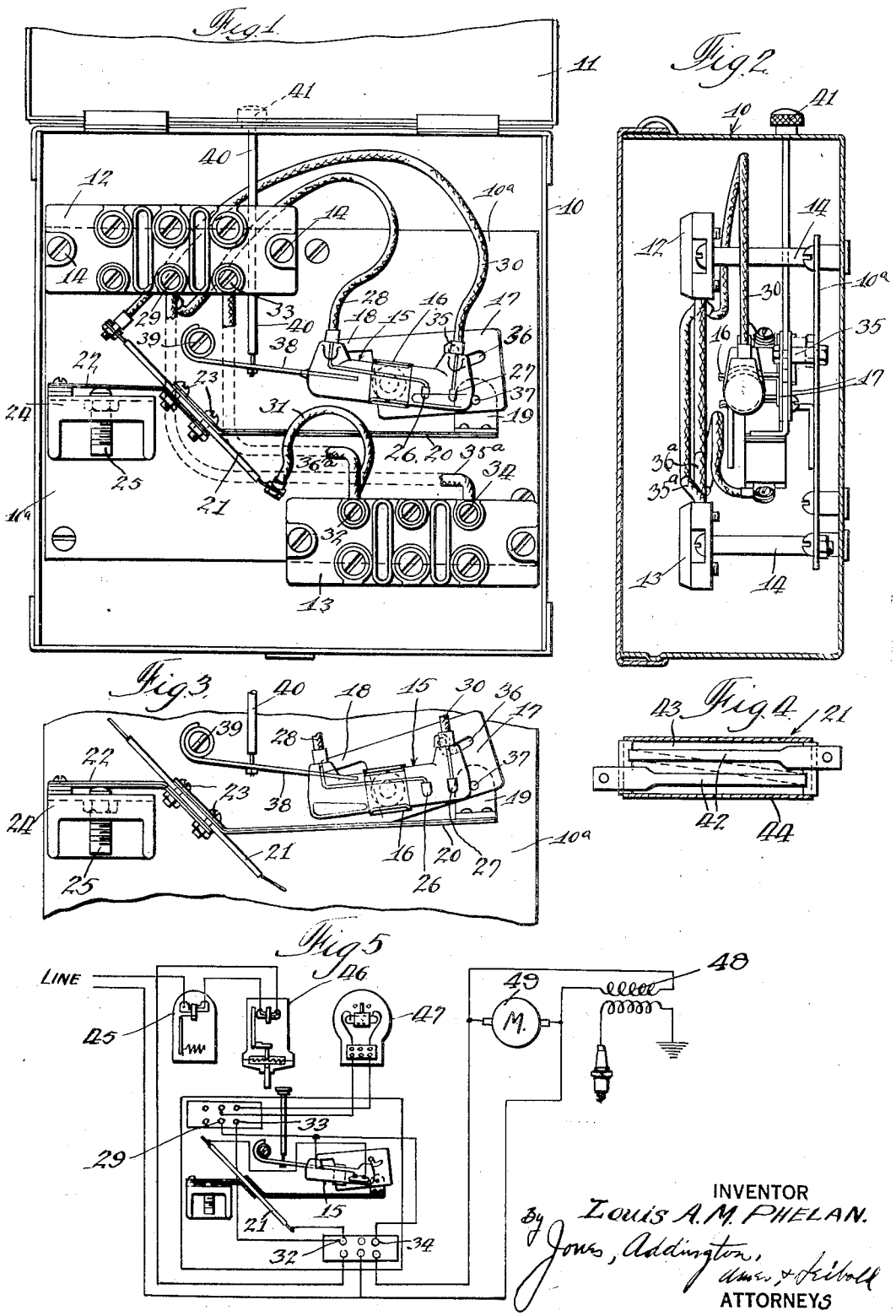

Patented Oct. 18, 1932

1,883,244

UNITED STATES PATENT OFFICE

LOUIS A. M. PHELAN, OF ELKHART, INDIANA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

ELECTRICAL SWITCH

Application filed April 27, 1927, Serial No. 186,883. Renewed June 9, 1931.

This invention relates to electrical switches and has special reference to thermostatically controlled switching means.

More particularly, this invention relates to tiltable electrical switches operated by an actuator which is thermostatically controlled, the controlling means comprising a heating element novelly connected to said actuator.

The device in this invention is particularly adapted to be used as a final safety switch in an electrical circuit employing other switching appliances for the normal control of the circuit, the device to operate only when a system controlled by said electrical circuit is out of running condition, whereupon it will act alone to control the electrical circuit. However, it is to be understood that this invention may be employed whereever it is desired to effect a circuit change at a predetermined time.

In order to obtain a thorough understanding of the uses of this invention, the latter will be hereinafter described in connection with an automatic heating system wherein the switch may be used with great effectiveness. Automatic heating systems are controlled by a device or a number of devices in an electrical circuit which latter devices control the supply of fuel to the burner and the ignition means therefor. For example, a room thermostat is disposed in a room or other enclosure and is responsive to variations of temperature therein for directing the supply of fuel to the burner and the ignition means therefor when the system is in a normal operative condition. However, it may be desirable to connect in the electrical circuit with the room thermostat a heat responsive switch which is generally known as a "stack switch", which latter is operated by the hot gases from the burner. Other switches may be disposed in this same electrical circuit and may include a pressure or a temperature switch disposed in the boiler or furnace of the heating system and operated by the pressure or temperature created therein.

The above mentioned switches control the normal operation of the heating system, however, should the burner fail to ignite for lack of oil, the motor fail to operate, or some element in the ignition system be out of order, the present safety switch, when disposed in an electrical circuit therewith, will cause both the fuel supply and the ignition means therefor to become disconnected from the line to terminate the operation of the entire system.

In order to preclude the possibility of this system from becoming operative before the attendant has become aware of the defectiveness of the system, this switch is so constructed that having obtained an open circuit position therethrough, a closed circuit is not possible except by manual restoration. The above is but one illustration of the use to which the present invention may be employed and it is to be understood, as before mentioned, that this device may be utilized wherever it is desired to control the operation of an electrical circuit at a predetermined time, the particular use thereof being when the control of the system acts as a safety measure.

One of the objects of this invention is to provide an improved timed switch.

A further object of this invention is to provide an electrical switch of the above mentioned type in which a two-part actuator is operated by a heating element novelly connected between the two parts of said actuator.

A further object of this invention is to provide a safety switch of the above mentioned type for use in an electrical circuit wherein other switches are employed, said safety switch to be used as a final control for effecting the inoperativeness of an entire system controlled by said electrical circuit in the event of any irregularities therein.

A further object of this invention is to provide a safety switch of the character indicated above, which, when operated into a position as to effect a circuit change, may be returned to its original position only by manual restoration.

Further objects and advantages will be apparent from the description and drawing forming a part of this specification to which reference may now be had for a more complete understanding of the characteristic features of this invention in which drawing:

Figure 1 is a front elevational view of the electrical switch showing a portion of the cover tilted back to an open position;

Fig. 2 is a side elevational view of Fig. 1 showing the casing in section and the cover in a closed position;

Fig. 3 is a view similar to Fig. 1 showing a portion of the electrical switch and a changed position of the switching means;

Fig. 4 is a detailed view of the heating element as embodied in this invention; and Fig. 5 is a diagrammatic view of an electrical circuit in which the present invention is embodied.

Referring now more particularly to the drawing, the electrical switch comprises a casing 10 having a cover 11 pivotally secured at the upper end thereof. A pair of terminal blocks 12 and 13 are secured to suitable posts 14 which extend from a plate 10ª suitably secured to and adjacent the rear wall of the casing. A plurality of contact strips are secured to each of the terminal blocks 12 and 13 to serve as a medium of connection between the operating mechanism within the casing 10 and the outside lines.

A mercury tube contactor 15 is mounted in a supporting clip 16 which latter is fixedly mounted to a latch plate 17 and adjacent one edge thereof. The latch plate 17 preferably comprises a pair of rectangularly shaped plates having a horizontally extending portion 18 preferably integral therewith disposed on the upper edge thereof. The lower edge, on the opposite side of the extension 18, is pivotally secured to a bracket 19 which latter is secured to one end of a bi-metallic element 20, said bracket 19 being preferably disposed between said plates 17. The bi-metallic element 20 extends horizontally within the casing and is secured to a heating element 21 preferably disposed at an angle to the bi-metallic element 20, said heating element being in turn secured to a second horizontally extending heat responsive element 22. The heat responsive elements 20 and 22 lie in substantially parallel planes and have inclined extensions to permit of a good thermal conductivity with and to conform to the angular position of the heating element 21, all of said elements being secured together preferably by means of the screws 23. However, this structure is not to be limited to a two-part heat responsive element, as it is necessary to have only one of the parts heat responsive for an effective operation thereof. Further, it may be desirable to employ an actuator of more than two parts connected together by a plurality of heating elements.

The aforementioned construction is fixedly mounted to the upper side of a channel shaped bracket 24 which latter is fixedly mounted to the plate 10ª. A screw member 25 in threaded engagement with the upper side of said bracket 24 bears against the underside of the bi-metallic element 22 at a point adjacent the fixed end thereof. The screw 25 is provided with a lock nut and is for the purpose of affording an adjustment for the two-part bi-metallic element. In the operation of this adjusting element, should the screw 25 be extended a distance through the bracket 24, the bi-metallic elements 20 and 22 would be raised whereby a lesser tilt of the mercury contactor tube would be necessary in order to break a circuit therethrough. Conversely, should the screw 25 recede in its movement, the bi-metallic elements 20 and 22 would lower and require a greater degree of tilt to break an electrical circuit through the mercury tube contactor 15. However, the actuation of the contactor will hereinafter be more fully described, whereafter a better understanding of this adjustable feature may be obtained.

The mercury tube contactor 15 comprises an elongated hermetically sealed container having a pair of spaced cooperating electrodes 26 and 27 disposed at one end thereof and a compact and coherent body of current conducting fluid such as mercury disposed therein. The electrode 26 is suitably connected to a lead wire 28 which latter is connected to a terminal 29. The electrode 27 is likewise suitably fastened to a lead wire 30 which latter is suitably connected to one end of the heating element 21, the other end of the heating element 21 being connected by means of a lead wire 31 to a terminal 32. The terminal 29 is connected by means of a lead wire 35ª to terminal 34 and the terminal 32 is connected by means of a lead wire 36ª to terminal 33. The terminals 29, 32, 33 and 34 are shown in Fig. 5 as being connected in an electrical circuit for governing an automatic heating system which will hereinafter be more fully described.

It has been stated that when the electrical circuit through the electrical switch has been broken, it is necessary to manually restore the switch to its normal operative position. By referring now more particularly to Figs. 1 and 3, it will be apparent that a flexing or warping of the bi-metallic element 20 upwardly will cause the contactor 15 to assume a position such as is shown in Fig. 3. The contactor normally rests in a position such as is shown in Fig. 1 by means of a post 35 secured to the plate 10ª and having a reduced portion for extending through the vertical portion of an L-shaped aperture 36 in the latch plate 17. The plate is thus held in a fixed position between the post 35 and the bracket 19. A movement upwardly of the bracket 19 will cause the plate 17 by its own weight and the weight of the contactor 15 to drop to a position where the extending portion 18 abuts an arm 38. It will now be seen that the latch plate 17 is locked between the arm 38 and the pivot 37, the reduced portion of the post 35 lying in the horizontally disposed portion of the aperture 36. Thus, after obtaining a locked position of the plate 17, it is necessary to pivot the latch plate on the pivot 37 in order to release said plate and return the same to its normal position.

The arm 38 is pivotally mounted at one end thereof to a support 39 which latter is secured to the plate 10a. A rod 40 is adjustably secured at its lower end to the arm 38 and extends upwardly therefrom through the casing 10. A knob 41 is secured to the rod 40 on the outside of the casing and limits the downward movement of the arm 38. In the operation of this switch thus far described, when the heating element 21 is supplied with electrical energy, the heat generated therefrom is transmitted to the bi-metallic elements 20 and 22 and causes a flexing or warping thereof in an upwardly direction whereby the latch plate 17 and the contactor 15 are tilted to a position such as is shown in Fig. 3 to break the electrical circuit through the contactor 15. After the electrical circuit has been thus broken and the contactor has been tilted to the aforementioned position, it is necessary to manually restore the same to its normal position by means of lifting the knob 41 and the rod 40 which permits the latch plate 17 to pivot on the pivot 37 and obtain a normal operative position such as is shown in Fig. 1.

The heating element 21 comprises a resistance element 42 preferably in the form of a ribbon which is wound around a strip of mica 43 any desired number of times, the coils being spaced and therefore insulated from each other. The resistance element is then placed in a casing 44 and suitably insulated therefrom, said casing being of a thin sheet of material which has a relatively high heat conductivity. The ends of the resistance element are suitably formed into terminals extending outside of the casing, said terminals having apertures therein for receiving connecting wires. It will be noted that the active conductor is wholly within the casing and has a good thermal contact with the casing enveloping it. By means of being disposed in contact with and between elongated end portions of the bi-metallic element, a good thermal conductivity is permitted therebetween and a relatively smooth heat application is permitted as will now be more fully described.

One of the advantages of this construction will be apparent when the heating element is employed to function with currents of changing magnitude, as, for example, when connected in series with motors which require excessive currents at starting. It is desirable to retard the increase of temperature in the heater element during these periods which are of a short duration so that the influence on the switch timing will be substantially negligible and that the heater element will not be subjected to these rises of temperature. These peaks and valleys of the electrical current are smoothed out by means of the casing which acts as a reservoir for the heat and delivers an even heat thus obtained over an extended contacting portion of the bi-metallic elements 20 and 22 without interfering with the mechanical operation thereof.

Referring now to Fig. 5 of the drawing, a wiring diagram is shown wherein the electrical switch of this invention is connected in an electrical circuit of an automatic heating system including a room switch 45, a pressure switch 46, a stack switch 47, ignition means 48 and a motor 49. Assuming that it is desired to operate the heating system, the switches 45 and 46 will be closed as the room has cooled off and the pressure in the boiler has decreased, and the switch 15 will occupy its normal closed position. The electrical circuit in the system will then be completed from one side of the line through the switch 45, switch 46, the terminal 32, the resistance element 21, the switch 15, terminal 34 through the motor 49 and back to the other side of the line. When the motor 49 is operated to permit a flow of fuel to the furnace, the electrical circuit through the ignition means 48 will likewise be completed to ignite the fuel. It will be noted that the entire motor current now flows through the resistance element 21 of the safety switch. However, presuming that the burner ignites, the stack switch 47, normally open and dependent for its operation on the hot gases emitted from the burner, will move to a closed circuit position whereby the aforementioned circuit condition exists only momentarily and an insufficient heat is obtained from the resistance element 21 to actuate the switch 15. In this closed position of the stack switch 47, less current is permitted to flow through the resistance element 21 for the reason that a path of lesser resistance may be obtained by means of shunting around the resistance element through the switch 47 to the motor 49 and back to the other side of the line. Therefore substantially none of the motor current will flow directly through the resistance element 21, the electrical circuit obtaining from one side of the line through the switch 45, switch 46, terminal 32, terminal 33, switch 47, terminal 29, terminal 34 through the motor 49 to the other side of the line. When it is desired to terminate the operation of the heating system, the switches 45 and 46, or either will then open the circuit and the motor and the ignition means will be disconnected from the line. This also permits the stack switch 47 to cool and to move into a cold position whereby the electrical circuit therethrough is disconnected.

Assuming that the oil burner does not ignite when the electrical circuit is completed through the motor and the ignition means, the stack switch 47 will not be heated and therefore will remain in a cold position and an electrical circuit will not be completed therethrough. As a consequence thereof, all of the current will flow to the motor 49 through the resistance element 21 for an undue length of time which will produce a sufficient amount of heat to actuate the switch 15 into an open circuit position whereby the contactor will occupy a position such as is shown in Fig. 3 and can only be restored by manual operation which has hereinbefore been described. It will be noted in this condition of the circuit that both the motor and the ignition means have been disconnected from the line.

The thermostatic switch 45, the pressure switch 46 and the stack switch 47 are well known in the art and a detailed description thereof is not deemed necessary. The thermostatically operated switch 45 is preferably controlled by means of an expansible and contractible bellows which actuates a vertically disposed element for tilting a mercury tube contactor into its circuit making-and-breaking positions. This particular device may be better understood by referring to United States Patent No. 1,704,370. The pressure switch 46 may preferably comprise a pressure chamber having a diaphragm disposed therein for actuating a vertically extending member which latter is connected to a tiltable mercury tube contactor. The operation of this device is more clearly illustrated and described in United States Patent No. 1,736,129. The thermostatically operated stack switch 47 comprises a helical bimetallic element which extends into a stack or a portion of the boiler whereby it may be heated by the hot gases from the burner to actuate a tiltable mercury tube contactor which latter is mounted on a rod actuated by said helical element. This device is clearly illustrated in a copending application, filed December 17, 1925, and bearing Serial No. 75,895 to which reference may be had for a complete description of the operation thereof. Although these latter devices have been particularly described in association with the switch of the present invention, it is to be understood that other well known apparatus may be effectively employed in an electrical circuit whereafter the present safety device may effect the final control thereof.

While but a single embodiment of this invention is herein shown and described, it is to be understood that this invention is not to be limited to that specific structure since it is obvious that many modifications may occur to those skilled in the art without departing from the spirit and scope of this invention and therefore it is desired that the latter be limited only by the scope of the prior art and the appended claims.

I claim:

1. In an electrical switch, a two-part expansible and contractible actuating element fixed at one end thereof, electric switching means controlled by said actuating element, and means for connecting said parts of said element end on end, whereby they extend in opposite directions from each other, said connecting means comprising an element to activate said expansible and contractible element thereby controlling the operation of said actuating element.

2. In an electrical switch, a two-part actuating element fixed at one end thereof, a tiltable switch mounted adjacent the other end of said actuating element and actuated thereby, and means for connecting said parts of said element end on end, said connecting means controlling the actuation of said element.

3. In an electrical switch, a heat responsive element fixed at one end thereof, said element comprising a plurality of parts placed end to end, a tiltable switch mounted adjacent the other end of said element and actuated thereby, and heating means connected intermediate two of said parts of said element, said heating means controlling the actuation of said element.

4. In an electrical switch, a substantially horizontal two-part heat responsive element fixed at one end thereof, a tiltable switch mounted adjacent the other end of said element and actuated thereby, and a heating element connected between said parts of said heat responsive element, said heating element controlling the operation of said heat responsive element.

5. In an electrical switch, a two-part actuating element fixed at one end thereof, pivotally mounted switching means actuated by said actuating element, and means for connecting said parts of said element, said connecting means adapted to control said actuating means for opening an electrical circuit through said switching means, and means for locking said switching means in an open circuit position whereby restoration thereof to a closed circuit position may be obtained by manual means only, said manual means being operable upon said switching means and independently of said actuating element.

6. In an electrical switch, a heat responsive element having an extension thereon, switching means actuated by said element, a heating element, and a second heat responsive element fixed at one end thereof and having an extension thereon, said extensions being placed end on end, whereby said heat responsive elements extend in opposite directions from said heating element, and said extensions being mechanically connected to and having substantial surface contact with said heating element.

7. In an electrical switch, a heat responsive element having an extension thereon disposed angularly thereto, switching means actuated by said element, a heating element, and a second heat responsive element fixed at one end thereof and having an extension on the other end thereof disposed angularly thereto, said extensions being connected to and having substantial surface contact with said heating element.

8. In an electrical switch, a substantially horizontal heat responsive element having an extension thereon disposed angularly thereto, a tiltable switch adjacent the other end of said heat responsive element and actuated thereby, a second heating element fixed at one end thereof and having an extension thereon disposed angularly thereto, said heat responsive elements and said extensions lying respectively in substantially parallel planes, and a heating element connected between said extensions and having a substantial surface contact therewith, said heating element controlling the operation of said heat responsive element.

9. In an electrical switch, a two-part actuating member, at least one of said parts being expansible and contractible, electric switching means controlled by said actuating member, and means for connecting said parts of said member end on end, whereby they extend in opposite directions from each other, said connecting means comprising an element to activate said expansible and contractible part thereby controlling the operation of said actuating member.

10. In an electrical switch, a two-part actuating element secured at one end thereof comprising flat bimetallic strips, switching means actuated by said actuating element, a heating element comprising a substantially flat casing having a current carrying coil disposed therein for connecting said two-parts of said actuating element, said heating element controlling the operation of said heat responsive element and insuring a substantial surface and therefore good thermal contact therebetween.

11. In an electrical switch, a heat responsive element having an extension thereon, switching means actuated by said element, a heating element, and a supporting element secured at one end thereof and having an extension thereon, said extensions being placed end on end, whereby said elements extend in opposite directions from each other, and said extensions being mechanically connected to and having substantial surface contact with said heating element.

12. In an electrical switch, an actuating element secured at one end thereof, said element comprising a plurality of parts placed end on end, a tiltable switch mounted near the other end of said actuating element and actuated thereby, at least one of said parts being heat responsive, and heating means disposed intermediate two of said parts of said element, said heating means controlling the actuation of said element.

13. In an electrical switch, an actuator comprising a plurality of strips at least one of which is heat responsive, said actuating element being secured at one end thereof, electric switching means actuated by said actuator, and means for connecting said strips of said actuating element end on end whereby they extend in opposite directions from each other, said connecting means comprising a heating element to activate said heat responsive strip thereby controlling the actuation of said actuating element.

14. A device of the character described, comprising a multi-part actuating element and an activating element secured between two of the parts of said actuating element in intimate contact therewith, said two parts respectively having portions extending in opposite directions from the portions in contact with said activating element.

15. An actuating device for an electric switch comprising a multi-part actuating element and an activating element secured between two of the parts of said actuating element in intimate contact therewith, said two parts respectively having portions extending in opposite directions from the portions in contact with said activating element.

16. A device of the character described, comprising a multi-part thermostatic element and a heating element secured between two of the parts of said thermostatic element in intimate contact therewith, said two parts respectively having portions extending in opposite directions from the portions in contact with said heating element.

17. An actuating device for an electric switch, comprising a multi-part thermostatic element and an electrical heating element secured between two of the parts of said thermostatic element in intimate contact therewith, said two parts respectively having portions extending in opposite directions from the portions in contact with said heating element.

18. A device of the character described, comprising an actuating element having two non-overlapping portions and two overlapping parts and an activating element secured between said two overlapping parts.

19. An actuating device for an electric switch, comprising two thermostatic members having two non-overlapping parallel portions and two overlapping portions, and an electrical heating element secured in contact with both of said two overlapping portions.

In witness whereof, I have hereunton subscribed my name.

LOUIS A. M. PHELAN.